(12) United States Patent
Wallace et al.

(10) Patent No.: US 12,542,572 B2
(45) Date of Patent: Feb. 3, 2026

(54) SYSTEMS AND METHODS FOR ASYNCHRONOUS DATA FLOW IN DIGITAL RADIOS

(71) Applicant: Skyworks Solutions, Inc., Irvine, CA (US)

(72) Inventors: Bradley Arthur Wallace, Austin, TX (US); Alexander Kleinerman, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 29 days.

(21) Appl. No.: 18/617,336

(22) Filed: Mar. 26, 2024

(65) Prior Publication Data

US 2024/0333329 A1 Oct. 3, 2024

Related U.S. Application Data

(60) Provisional application No. 63/492,409, filed on Mar. 27, 2023.

(51) Int. Cl.
*H04B 1/16* (2006.01)
*H04L 27/26* (2006.01)

(52) U.S. Cl.
CPC .......... *H04B 1/16* (2013.01); *H04L 27/2649* (2013.01)

(58) Field of Classification Search
CPC ................................ H04B 1/16; H04L 2/2649
See application file for complete search history.

(56) References Cited

U.S. PATENT DOCUMENTS

| | | | |
|---|---|---|---|
| 6,295,325 B1 * | 9/2001 | Farrow | H04L 7/0278 375/327 |
| 7,339,503 B1 | 3/2008 | Elenes | |
| 8,237,869 B2 | 8/2012 | Blouin et al. | |
| 8,532,601 B2 | 9/2013 | Tuttle et al. | |
| 8,804,865 B2 | 8/2014 | Elenes et al. | |
| 8,976,969 B2 | 3/2015 | Elenes et al. | |
| 10,789,965 B2 | 9/2020 | Wallace et al. | |
| 10,911,289 B1 | 2/2021 | Strickland et al. | |
| 11,729,028 B2 | 8/2023 | Kleinerman et al. | |
| 2017/0041129 A1 * | 2/2017 | Nekhamkin | H04L 7/0041 |
| 2019/0386761 A1 * | 12/2019 | Lewis | H04L 25/05 |

* cited by examiner

*Primary Examiner* — Janice N Tieu
(74) *Attorney, Agent, or Firm* — Knobbe, Martens, Olson & Bear, LLP

(57) ABSTRACT

Systems and methods for asynchronous data flow in digital radios are provided. In one aspect, a demodulator circuit includes a receiver circuit configured to receive: a plurality of samples of a radio frequency signal received from a tuner, a clock, and a target size value, the receiver circuit further configured to output the samples at a first rate based on the target size value. The demodulator circuit also includes a sample rate converter configured to receive the samples from the receiver circuit and output the samples at a second rate based on a rate offset value, and a buffer configured to receive the samples from the sample rate converter and output the samples. The demodulator circuit further includes a digital demodulator configured to receive the samples from the buffer and demodulate the samples, and a control loop configured to generate the target size value.

20 Claims, 6 Drawing Sheets

SYSTEMS AND METHODS FOR ASYNCHRONOUS DATA FLOW IN DIGITAL RADIOS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of this disclosure relate to techniques for asynchronous data flow that can be used in digital radios.

Description of the Related Technology

Radio receivers are omnipresent in modern technology. In addition to standalone radios for receipt of broadcast radio signals, all manners of tech and non-tech devices include some type of radio receiver (and often paired with a transmitter). Such modem circuitry is present in any device having wireless capabilities. While some broadcast radio signals are transmitted with analog coding (e.g., conventional AM and FM signals), other terrestrial and satellite wireless communication systems use some type of digital encoding. Some example digital radio systems include National Radio System Committee (NRSC-5C, also known as HD™ radio), Digital Audio Broadcasting (DAB), Digital Radio Mondiale (DRM) or other standard. In certain cases, a radio receiver may use a synchronous data interface to communicate the received radio signals between different integrated circuits, which can present design challenges for the flow of data within the radio receiver.

SUMMARY

The innovations described in the claims each have several aspects, no single one of which is solely responsible for its desirable attributes. Without limiting the scope of the claims, some prominent features of this disclosure will now be briefly described.

One aspect of this disclosure is demodulator circuit comprising: a receiver circuit configured to receive a clock, a plurality of samples of a radio frequency signal received from a tuner, and a target size value, the receiver circuit further configured to output the samples at a first rate based on the target size value; a sample rate converter configured to receive the samples from the receiver circuit and a rate offset value, and to output the samples at a second rate based on the rate offset value; a buffer configured to receive the samples from the sample rate converter; a digital demodulator configured to receive the samples from the buffer and demodulate the samples; and a control loop configured to generate the target size value to prevent the buffer from underflowing and from overflowing.

In some embodiments, the digital demodulator is further configured to synchronize with the tuner and generate an ideal request size value based on the synchronizing with the tuner, the control loop further configured to generate the target size value based at least in part on the ideal request size value.

In some embodiments, the control loop includes: a first combiner configured to output a difference value between half of a size of the buffer and a current volume of samples in the buffer; a loop filter configured to receive the difference value from the first combiner and generate a delta value; and a second combiner configured to receive the delta value from the loop filter and the ideal request size value from the digital demodulator, the second combiner further configured to generate the target size value based on the delta value and the ideal request size value.

In some embodiments, the receiver circuit includes an inter integrated circuit sound receiver.

In some embodiments, the demodulator circuit further comprises a clock generator configured to generate a demodulator clock, wherein the demodulator clock is asynchronous with a tuner clock of the tuner.

In some embodiments, the sample rate converter, the buffer, the digital demodulator, and the control loop are implemented by a software function.

In some embodiments, the receiver circuit includes an internal buffer and the receiver circuit is configured to execute the software function in response to a current volume of samples in the internal buffer being equal to the target size.

Another aspect is a digital radio system comprising: a tuner circuit configured to receive a passband radio frequency signal and convert the passband radio frequency signal into a baseband signal; and a demodulator circuit including: a receiver circuit configured to receive a clock, a plurality of samples of a radio frequency signal received from a tuner, and a target size value, the receiver circuit further configured to output the samples at a first rate based on the target size value; a sample rate converter configured to receive the samples from the receiver circuit and a rate offset value, and to output the samples at a second rate based on the rate offset value; a buffer configured to receive the samples from the sample rate converter; a digital demodulator configured to receive the samples from the buffer and demodulate the samples; and a control loop configured to generate the target size value to prevent the buffer from underflowing and from overflowing.

In some embodiments, the digital demodulator is further configured to synchronize with the tuner and generate an ideal request size value based on the synchronizing with the tuner, the control loop further configured to generate the target size value based at least in part on the ideal request size value.

In some embodiments, the control loop includes: a first combiner configured to output a difference value between half of a size of the buffer and a current volume of samples in the buffer; a loop filter configured to receive the difference value from the first combiner and generate a delta value; and a second combiner configured to receive the delta value from the loop filter and the ideal request size value from the digital demodulator, the second combiner further configured to generate the target size value based on the delta value and the ideal request size value.

In some embodiments, the receiver circuit includes an inter integrated circuit sound receiver.

In some embodiments, the demodulator further includes a clock generator configured to generate a demodulator clock, wherein the demodulator clock is asynchronous with a tuner clock of the tuner.

In some embodiments, the sample rate converter, the buffer, the digital demodulator, and the control loop are implemented by a software function.

In some embodiments, the receiver circuit includes an internal buffer and the receiver circuit is configured to execute the software function in response to a current volume of samples in the internal buffer being equal to the target size.

Yet another aspect is a method of demodulating a radio frequency signal comprising: receiving, at a receiver circuit, a plurality of samples of a radio frequency signal received from a tuner, a clock, and a target size value; outputting, from the receiver circuit, the samples at a first rate based on the target size value; receiving, at a sample rate converter, the samples from the receiver circuit and a rate offset value; outputting, from the sample rate converter, the samples at a second rate based on the rate offset value; receiving, at a buffer, the samples from the sample rate converter; outputting the samples from the buffer; demodulating, at a digital demodulator, the samples received from the buffer; and generating, at a control loop, the target size value to prevent the buffer from underflowing and from overflowing.

In some embodiments, the method further comprises: synchronizing, at the digital demodulator, with the tuner; generating, at the digital demodulator, an ideal request size value based on the synchronizing with the tuner; and generating, at the control loop, the target size value based at least in part on the ideal request size value.

In some embodiments, the method further comprises: outputting, at a first combiner, a difference value between half of a size of the buffer and a current volume of samples in the buffer; receiving, at a loop filter, the difference value from the first combiner and generate a delta value; receiving, at a second combiner, the delta value from the loop filter and the ideal request size value from the digital demodulator; and generating, at the second combiner, the target size value based on the delta value and the ideal request size value.

In some embodiments, the receiver circuit includes an inter integrated circuit sound receiver.

In some embodiments, the method further comprises generating, at a clock generator, a demodulator clock, wherein the demodulator clock is asynchronous with a tuner clock of the tuner.

In some embodiments, the sample rate converter, the buffer, the digital demodulator, and the control loop are implemented by a software function.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein are directed to systems and methods for providing asynchronous data flow in digital radios in order to maintain data flow requirements for proper processing according to an encoding standard. For example, the techniques described herein can involve modulating the run rate of an orthogonal frequency-division multiplexing (OFDM) processing function and the number of samples applied to the input of a sample rate converter (SRC) in order to maintain data flow requirements for OFDM processing. In addition, the techniques described herein can, at the same time as modulating the run rate, maintain a fixed rate, as defined by a tuner chip, at an interface of an inter-IC sound (i2s) receiver. One or more these aspects can be implemented without changing a clock rate of the OFDM demodulator. Moreover, aspects of this disclosure can also apply a single offset estimate to directly convert to the transmitter (broadcast) rate.

Introduction to Radio Systems

Figure 1A:
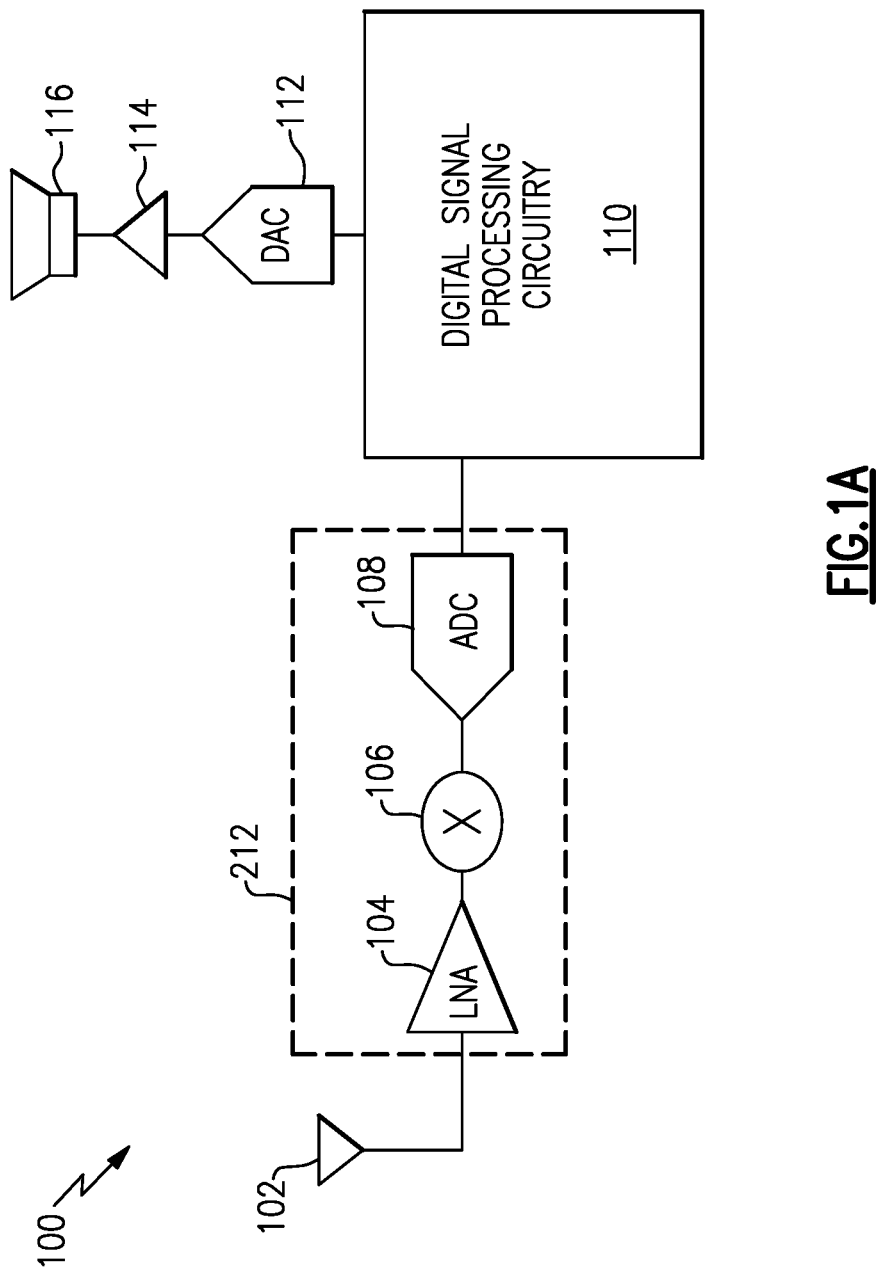
FIG. 1A is a schematic diagram of an example radio system according to an embodiment.

FIG. 1A is a schematic diagram of an example radio system 100 according to an embodiment. The radio system 100 can receive and process a digital radio signal. The radio system 100 can generate audio from the digital radio signal. The radio system 100 can process a digital radio signal can be in accordance one or more suitable digital radio standards, such as one or more of National Radio System Committee (NRSC-5C, also known as HD™ radio), Digital Audio Broadcasting (DAB), Digital Radio Mondiale (DRM), CDR, or another digital radio standard. As illustrated, the radio system 100 includes an antenna 102, a low noise amplifier (LNA) 104, a mixer 106, an analog-to-digital converter (ADC) 108, digital signal processing circuitry 110, a digital-to-analog converter (DAC) 112, an amplifier 114, and a speaker 116. In some embodiments, the LNA 104, the mixer 106, and the ADC 108 may form a tuner integrated circuits (IC) 212, discussed in detail below.

With reference to the radio system 100 of FIG. 1A, a radio frequency signal that includes digital radio signals according to a given digital broadcast specification can be received via the antenna 102. In some instances, the radio frequency signal can be received via two or more antennas.

A radio frequency signal received via the antenna 102 can be processed by a receive signal path and provided to the digital signal processing circuitry 110. The radio frequency signal path includes at least an LNA 104, a mixer 106, and an ADC 108. In some instances, the radio frequency signal path can include additional circuit elements, such as one or more filters, one or more amplifiers with automatic gain control, etc. A radio frequency signal received via 102 can be amplified by the LNA 104. The amplified RF signal can be downconverted by the mixer 106. The downconverted signal generated by the mixer 106 can be a low-intermediate frequency (IF) or zero-IF signal, for example. The downconverted signal can include an in-phase/quadrature phase (IQ) signal. The ADC 108 can digitize the downconverted signal into a digital signal.

The digital signal processing circuitry 110 can perform any suitable processing on the digitized signal provided by the ADC 108. For example, the digital signal processing circuitry 110 can perform processing described with reference to FIG. 1B and/or FIGS. 2-5. The digital processing circuitry 110 can generate an audio output signal. In some embodiments, the digital processing circuitry 110 can be included on a demodulator IC 214 and/or the digital processing circuitry 110 can implement an OFDM processing block 304 as described herein.

The audio output signal can be converted from a digital signal to an analog signal by a digital-to-analog converted (DAC) 112. The analog audio signal can be amplified by amplifier 114. The amplified analog audio signal can be provided to a speaker 116. The speaker 116 can output audio. While one speaker is shown in FIG. 1A, audio can be output from any suitable number of speakers based on one or more audio signals provided by the digital signal processing circuitry 110.

Figure 1B:
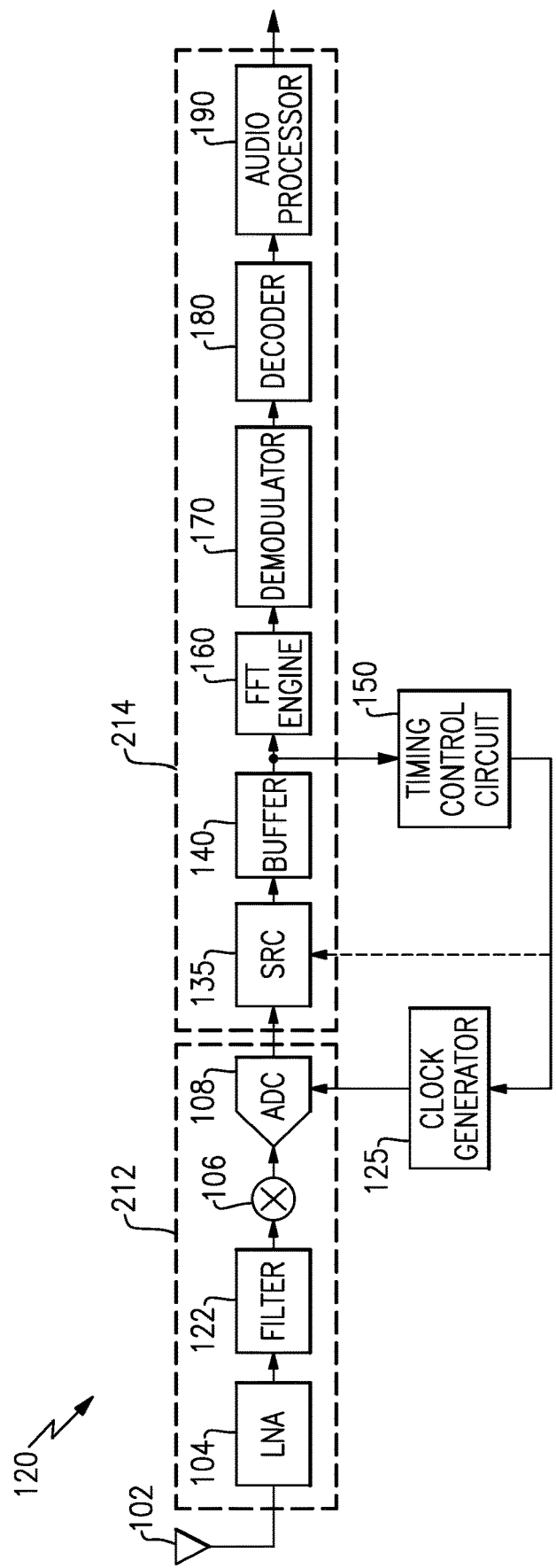
FIG. 1B is a schematic diagram of a receiver according to an embodiment.

FIG. 1B shows an example of a receiver 120. In some embodiments, receiver 120 can be embodied in a single-die integrated circuit, such as a complementary metal oxide semiconductor (CMOS) die having mixed signal circuitry including both analog and digital circuitry. According to some other embodiments, the receiver 120 can be implemented by two or more semiconductor dies, such as a tuner IC 212 and a demodulator IC 214 shown in FIG. 2.

As illustrated, the receiver 120 includes an antenna 102, an LNA 104, a filter 122, a mixer 106, an ADC 108, a clock generator 125, a sample rate converter (SRC) 135, a buffer 140, a timing control circuit 150, a fast Fourier transform (FFT) engine 160, a demodulator 170, a decoder 180, and an audio processor 190. The SRC 135, the buffer 140, the FFT engine 160, the demodulator 170, the decoder 180, and the audio processor 190 can be included in the digital processing circuitry 110 of FIG. 1B. In some embodiments, the LNA 104, the filter 122, the mixer 106, and the ADC 108 can be included in a tuner IC and the SRC 135, the buffer 140, the FFT engine 160, the demodulator 170, the decoder 180, and the audio processor 190 may be included in the demodulator IC 214.

A radio frequency signal is received at the antenna 102. The LNA 104 amplifies the radio frequency signal. The filter 122 filters the amplified radio frequency signal provided by the LNA 104. The LNA 104 and the filter 122 can be considered radio frequency front end blocks. In certain applications, the receiver 120 can include additional radio frequency circuitry (not illustrated in FIG. 1B). The mixer 106 can downconvert the filtered radio frequency signal provided by the filter 122 to a lower frequency signal. In certain applications, this lower frequency signal can a low-IF or zero-IF signal. The downconverted signal can be an IQ signal.

The ADC 108 can digitize the downconverted signal into a digital signal at a sampling rate based on a clock signal received from a clock generator 125. The clock generator 125 can be implemented as a local oscillator, phase lock loop, or another suitable clock generation circuit. In some applications, the sampling clock signal and a mixing signal provided to the mixer 106 may be derived from the same frequency oscillator, for example, by multiplying or dividing the signal received from the frequency oscillator. The clock generator 125 can also provide a reference frequency which can be multiplied by a fixed ratio and then provided as the mixing signal to mixer 106. In certain applications, either before or after digitization, channelization may be performed to generate a channelized signal. In an OFDM system, a plurality of samples can form an OFDM symbol of an incoming data stream.

The SRC 135 can receive the digitized signals from the ADC 108. The SRC 135 can be an asynchronous or arbitrary sample rate converter that receives incoming digitized samples at an arbitrary sampling frequency, resamples the samples, and outputs the samples according to a fixed sampling frequency. The arbitrary sampling frequency can be under microcontroller control, for example. The fixed sampling frequency can be a virtual frequency at which downstream processing components operate, for example. In some applications, SRC 135 implements a Farrow variable digital filter structure with coefficients varied based on of a control variable. Any other suitable SRC 135 can be implemented.

The SRC 135 provides the resampled samples to the buffer 140. The buffer 140 can be a first in first out (FIFO) buffer. The incoming samples stored in buffer 140 and can then be output to a main digital signal processing path including the FFT engine 160. The FFT engine 160 can generate frequency domain OFDM symbols from incoming time domain OFDM symbols. In certain applications, each incoming time domain OFDM symbol can be processed by FFT engine 160 into a plurality of sub-carriers. The number of sub-carriers corresponding to a given OFDM symbol can vary depending on bandwidth of signal and a time duration of the OFDM symbol (without a cyclic prefix).

The incoming time domain OFDM symbols stored in buffer 140 can also be provided to the timing control circuit 150. The timing control circuit 150 can perform timing estimation to determine a synchronization of the OFDM symbols. Accordingly, the OFDM symbols can be provided to downstream digital processing circuitry in correct synchronization. The timing control circuit 150 can compensate for symbol timing offset and/or sample rate offset. The timing control circuit 150 can provide a control signal to the clock generator 125 to adjust a clock signal provided to the ADC 108. Alternatively or additionally, the timing control circuit 150 can adjust the SRC 135.

The sub-carrier outputs from FFT engine 160 can form a frequency domain symbol that is provided to the demodulator 170. The demodulator 170 can demodulate the sub-carrier outputs from the FFT engine 160 and provide demodulated sub-carriers. The demodulator 170 can be a sub-symbol decoder to produce soft information (e.g., 1 s of bit per carrier in 2 PAM, 2 soft bits per carrier in QPSK, 4QAM, etc.) per sub-carrier. The decoder can decode the demodulated sub-carriers from the demodulator 170. The decoder 180 can perform correction and/or information bit extraction. The output signal from the decoder 180 can be processed by the audio processor 190. The audio processor 190 can perform any suitable audio processing. The audio processor 190 can generated an encoded audio signal that is decoded in downstream circuitry (not illustrated in FIG. 1B) to generate source audio. In the case of a data link, information bits may be provided to a data processor. Although shown as individual components, portions of the receiver 120 after ADC 108 to the end of the signal processing path of FIG. 1B can be implemented in a digital signal processor (DSP).

In other implementations are possible, and additional circuitry can be present. For example, in certain applications, additional circuitry can be implemented. In addition, filters, correlators, and/or mode selection circuitry may be configured in other types of hardware, may be realized via combinations of hardware, firmware, and/or software, and also may be implemented within a microcontroller or DSP.

Data Flow in Digital Radios

In many implementations, radio receivers can be segmented into different circuits. For example, a radio receive may be segmented into different integrated circuits (ICs), which can include a tuner IC, a demodulator IC, and an audio processing IC. Each IC can be configured to run off its own clock, which may present problems in the real-time data flow from chip to chip, particularly when a synchronous data interface is desired.

Figure 2:
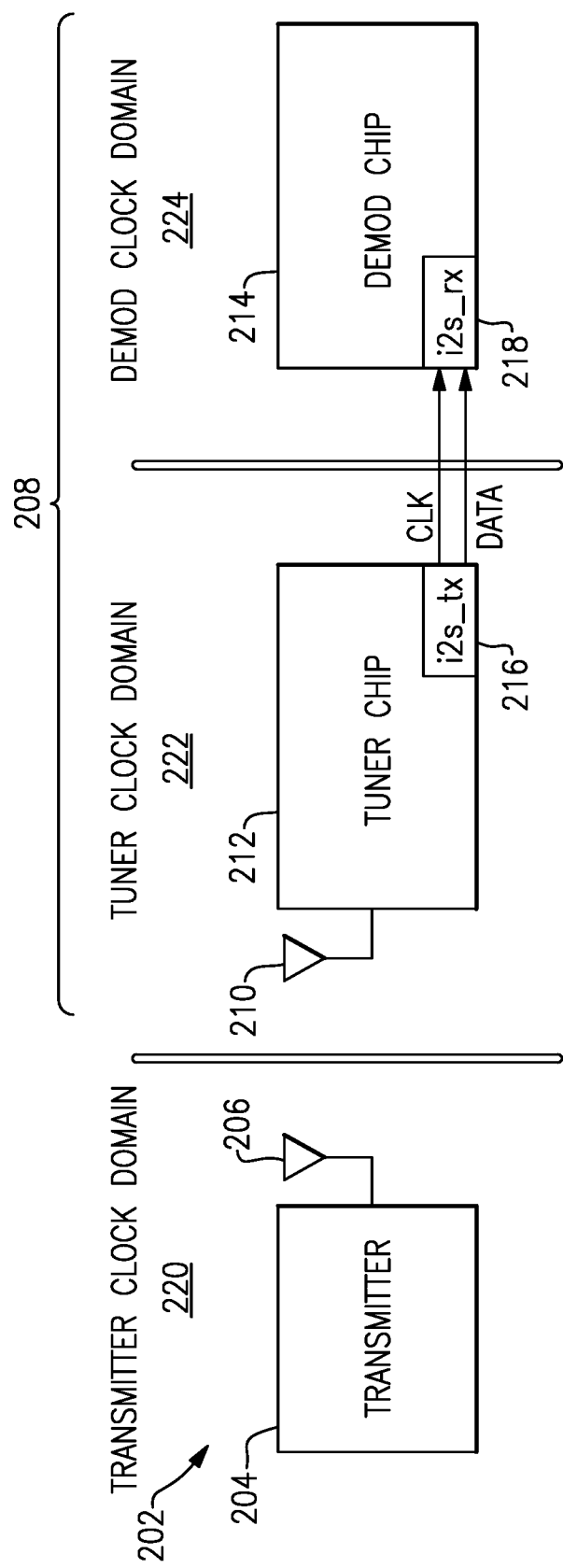
FIG. 2 illustrates a wireless transmitter and a radio receiver in accordance with aspects of this disclosure.

FIG. 2 illustrates a wireless transmitter 202 and a radio receiver 208 in accordance with aspects of this disclosure. The wireless transmitter 202 includes a transmitter IC 204 and an antenna 206. The radio receiver 208 includes an antenna 210 and two ICs: a tuner IC 212, a demodulator IC 214. The tuner IC 212 includes an inter-IC transmitter 216 while the demodulator IC 214 includes an inter-IC receiver 218. In some embodiments, the inter-IC transmitter 216 and the inter-IC receiver 218 are configured to implement the i2s standard.

Each of the transmitter IC 204, tuner IC 212, and the demodulator IC 214 may have its own clock domain. For example, the transmitter IC 204 may have a transmitter clock domain 220, the tuner IC 212 may have a tuner clock domain 222, and the demodulator IC 214 may have demodulator clock domain 224. That is, each of the transmitter IC 204, tuner IC 212, and the demodulator IC 214 can be configured to generate its own internal clock signal, which may not be synchronized with the clock signals in the other clock domains 220-224.

The transmitter IC 204 is configured to transmit a radio frequency signal via the antenna 206. In some embodiments, the transmitter IC 204 can be configured to transmit OFDM signals via the antenna 206. In these embodiments, the demodulator IC 214 can be configured as an OFDM demodulator in order to demodulate the OFDM signal received from the transmitter IC 204.

The tuner IC 212 is configured to receive the radio frequency signal from the transmitter IC 204 via the antenna 210. The tuner IC 212 is configured to converts the radio frequency signal from passband to baseband data (or simply "data"). For example, the tuner IC 212 can be configured to convert the radio frequency signal into a baseband complex-IQ signal. The demodulator IC 214 is configured to convert the baseband signal into received data, which can be formed in individual bits in certain implementations.

The inter-IC transmitter 216 is configured to provide the data to the inter-IC receiver 218 of the demodulator IC 214 over a synchronous data interface. As described herein, the synchronous data interface may be i2s in some implementations. The inter-IC transmitter 216 is also configured to provide a clock signal clk to the inter-IC receiver 218. The inter-IC transmitter 216 can be configured to generate the clock signal clk to be synchronized with the data provided to the inter-IC receiver 218. In some embodiments, the inter-IC transmitter 216 can transfer the data at a fixed rate, without feedback from the inter-IC receiver 218 or the demodulator IC 214. Thus, the inter-IC transmitter 216 may not receive any feedback regarding whether to speed up or slow down the data transfer rate.

As shown in FIG. 2, the tuner IC 212 and the demodulator IC 214 may operate in separate clock domains, e.g., the tuner clock domain 222 and the demodulator clock domain 224. Accordingly, the data and clock signal clk received at the inter-IC receiver 218 may not be synchronized with the clock generated by the demodulator IC 214. Thus, the data may not be clocked at the same rate as the sample rate expected by the demodulator IC 214. For example, if the i2s clock of the inter-IC transmitter 216 is 5 Hz greater than the rate at which the demodulator clock domain 224 pulls data from a buffer attached to the inter-IC receiver 218, the buffer will eventually overflow. To avoid buffer flow, the difference between the clocks of the tuner IC 212 and demodulator IC 214 can be compensated. One way in which buffer overflow can be avoided is by running the demodulator IC 214 (or a software process running thereon) at a slightly faster processing rate, such that the clock of the demodulator IC 214 is running at a faster rate than the clock clk synchronized to the data.

The transmitter IC 204 is configured to operate in its own clock domain transmitter clock domain 220. Accordingly, the difference between the clock clk and the internal clock of the inter-IC receiver 218 can be compensated by estimating the clock offset between the clock of the transmitter IC 204 and the clock of the demodulator IC 214 as part of the demodulation process performed by the demodulator IC 214.

Figure 3:
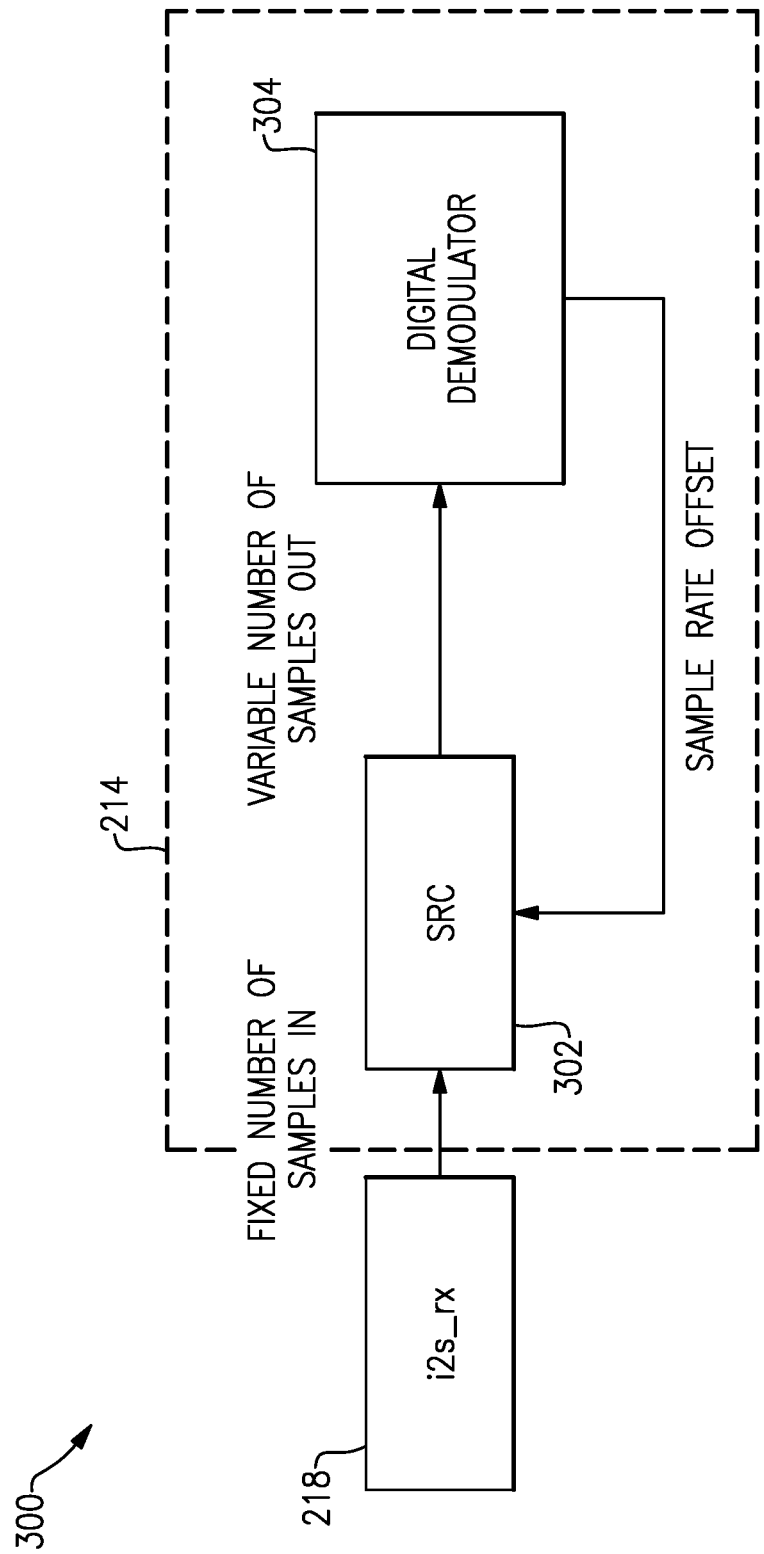
FIG. 3 illustrates a view of the data flow within the demodulator IC in accordance with aspects of this disclosure.

FIG. 3 illustrates a view of the data flow 300 within the demodulator IC 214 in accordance with aspects of this disclosure. As shown in FIG. 3, the demodulator IC 214 includes the inter-IC receiver 218, a sample rate converter (SRC) 302, and a digital demodulator 304. Depending on the implementation, the digital demodulator 304 can include an OFDM processing block (also referred to an "OFDM processor"), a television, a cell phone modem, a router, etc. In some embodiments, the SRC 302 can be implemented in a hardware accelerator that receives a fixed number of samples as an input and produces a potentially different number of samples (e.g., a variable number of samples) as an output. Although the SRC 302 may be implemented in a hardware accelerator in certain embodiments, aspects of this disclosure are not limited thereto and the SRC 302 may be implemented in software in different implementations.

The variable number of samples output by the SRC 302 may be dependent on a sample rate offset parameter and the internal state of the SRC 302. The sample rate offset parameter may be provided as an input to the SRC 302. For example, the digital demodulator 304 may provide the sample rate offset parameter to the SRC 302. Because the variable number of samples output by the SRC 302 is dependent on the sample rate offset parameter and the internal state of the SRC 302, number of samples output from the SRC 302 may not be easily predictable.

The digital demodulator 304 receives the variable number of samples from the SRC 302 and processes the received samples to recover the baseband data. In addition, the digital demodulator 304 is configured to generate the sample rate offset parameter to provide feedback to the SRC 302. For example, the digital demodulator 304 may be configured to process a defined number of samples at a given time. For example, the digital demodulator 304 may be configured to process a block of samples, where the number of samples within the block is referred to as a block size. In some cases, the block size processed by the digital demodulator 304 may vary from one call to another call depending on the symbol type. For example, as discussed herein the SRC 302 may output different number of samples from call to call which may differ from the number of samples that the digital demodulator 304 is configured to process at once. In some embodiments, the digital demodulator 304 may generate the sample rate offset parameter to be indicative of the difference between the variable number of samples and the block size.

Because the number of samples output by the SRC 302 is variable, the number of samples received at the digital demodulator 304 may be different from the block size that the digital demodulator 304 is configured to process at once, it can be important to handle the discrepancy between the variable number of samples output from the SRC 302 and the block size processed by the digital demodulator 304. As discussed above, because the variable number of samples output by the SRC 302 may not be easily predictable, the sample rate offset parameter may not be sufficient to ensure that the variable number of samples matches the block size.

Figure 4:
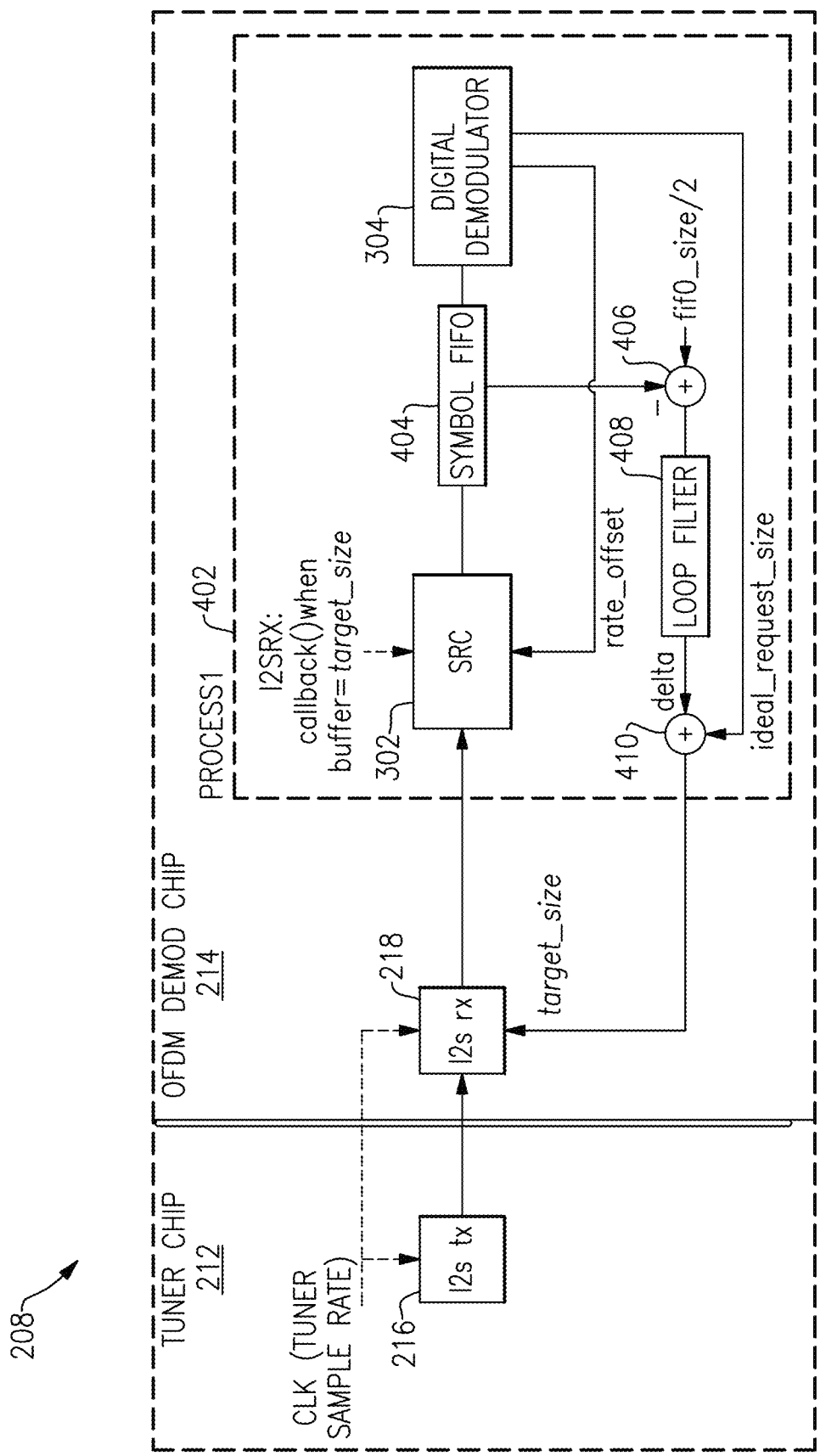
FIG. 4 illustrates an example embodiment of the radio receiver in accordance with aspects of this disclosure.

FIG. 4 illustrates an example embodiment of the radio receiver 208 in accordance with aspects of this disclosure. As shown in FIG. 4, the demodulator IC 214 implements a first process 402 configured to receive samples from the inter-IC receiver 218 and provide a target_size parameter as feedback to the inter-IC receiver 218. The first process 402 includes the SRC 302, the FIFO buffer 404, the digital demodulator 304, a first combiner 406, a loop filter 408, and a second combiner 410.

The inter-IC receiver 218 can be configured to receive a plurality of samples of a radio frequency signal received from the inter-IC transmitter 216. The inter-IC receiver 218 may also receive a clock from the tuner IC 212 and a target size value from a control loop including the first combiner 406, the loop filter 408, and the second combiner 410. The control loop may be configured to generate the target size value to prevent the FIFO buffer 404 from underflowing and from overflowing. The inter-IC receiver 218 is further configured to output the samples at a first rate based on the target size value. For example, the inter-IC receiver 218 may output samples when the number of samples ready at the inter-IC receiver 218 reaches the target_size. In some embodiments, the inter-IC receiver 218 may include an internal buffer configured to store the samples when the number of samples ready at the inter-IC receiver 218 is less than the target_size.

The SRC 302 is configured to receive the samples from the inter-IC receiver 218. The SRC 302 is also configured to receive a rate offset value rate_offset from the digital demodulator 304. The SRC 302 is further configured to output the samples to the FIFO buffer 404 at a second rate based on the rate offset value. The second rate may be different from the first rate depending on the rate offset value received.

The FIFO buffer 404 is configured to receive the samples from the SRC 302 and output the samples to the digital demodulator 304. In some embodiments, the FIFO buffer 404 may output the samples at a substantially fixed rate. The digital demodulator 304 is configured to receive the samples from the FIFO buffer 404 and demodulate the samples.

Similar to the data flow 300 of FIG. 3, the SRC 302 receives a fixed number of samples as an input and produces a variable number of samples as an output. The FIFO buffer 404 is configured to receive the variable number of samples from the SRC 302 and provide a number of samples to the digital demodulator 304 based on the current block size requested by the digital demodulator 304. The FIFO buffer 404 includes a read/write pointer that represents how full the FIFO buffer 404 is (e.g., a current volume of samples in the FIFO buffer 404). The FIFO buffer 404 can be configured to provide the read/write pointer to the first combiner 406.

One function of the radio receiver 208 embodiment of FIG. 4 is to prevent the FIFO buffer 404 from underflowing or overflowing. In order to prevent under- or overflow, the first process 402 is configured to determine the target_size, which is a number of samples to request from the inter-IC receiver 218 in order to maintain the FIFO buffer 404 near a constant fullness level or volume of samples in the FIFO buffer 404. In some cases, the target_size may be determine to attempt to maintain the FIFO buffer 404 as substantially half full. When the number of samples ready at the inter-IC receiver 218 reaches the target_size, the inter-IC receiver 218 provides a callback function and the first process 402 receives and processes the samples from the inter-IC receiver 218.

The first combiner 406 receives the read/write pointer of the FIFO buffer 404 and compares the read/write pointer to a first value representing half the size of the FIFO buffer 404. The loop filter 408 is configured to receive the output from the first combiner 406 and generate a difference value (also referred to as a delta value) between the current volume of samples in the FIFO buffer 404 and the first value representing half the size of the FIFO buffer 404. The second combiner 410 receives the difference value from the loop filter 408 and an ideal_request_size from the digital demodulator 304.

Before the digital demodulator 304 synchronizes with the transmitter IC 204, the data received by the FIFO buffer 404 may have a sample rate that is substantially equal to the sample rate of the inter-IC transmitter 216 and no sample rate conversion will have been required at the SRC 302. These samples can then be used by the digital demodulator 304 to determine the sample rate offset with respect to the transmitter IC 204. The digital demodulator 304 can then provide the determined sample rate offset rate_offset to the SRC 302.

As the digital demodulator 304 synchronizes with the transmitter IC 204, the rate_offset may deviate from zero, and thus, the SRC 302 may being performing same rate conversion. The sample rate conversion performed by the SRC 302 may involve interpolation and change to the rate of samples received at the FIFO buffer 404 to the sample rate of the transmitter IC 204. Due to the change in the sample rate input to the FIFO buffer 404, the volume of samples in the FIFO buffer 404 will change, which can result in a non-zero difference value and/or the digital demodulator 304 adjusting the ideal_request_size. Based on these changes, the second combiner 410 can generate a new target_size for the next sample request.

By providing feedback in the form of the target_size parameter, the first process 402 is able to run at the sample rate of the inter-IC transmitter 216 on average while the SRC 302 outputs samples at the transmitter IC 204 rate on average. Thus, the volume of samples in the FIFO buffer 404 can be maintained at about half full on average.

Figure 5:
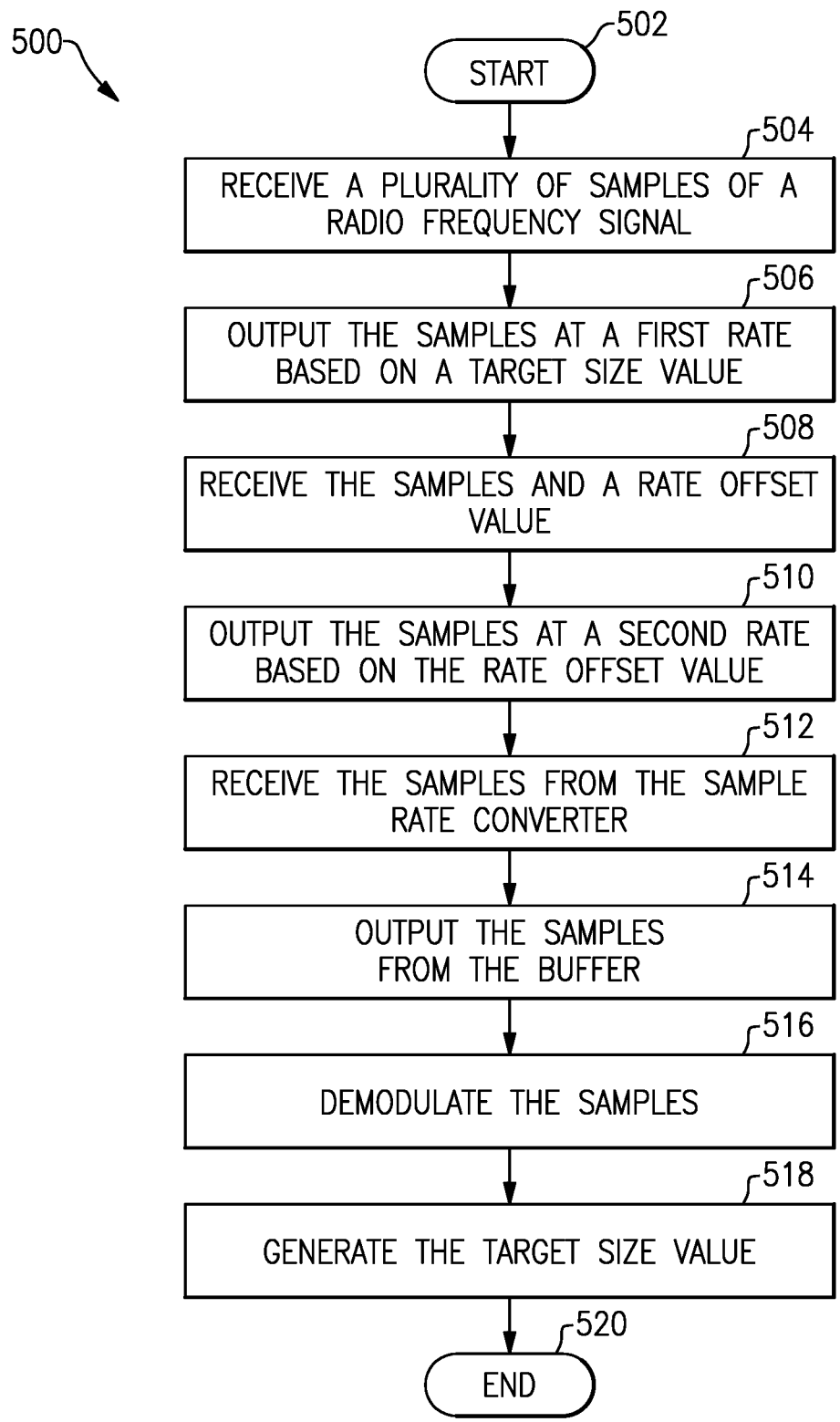
FIG. 5 is a flow diagram of a method for demodulating a radio frequency signal in accordance with another embodiment.

FIG. 5 is a flow diagram of a method for demodulating a radio frequency signal in accordance with another embodiment. The method 500 can be performed by devices of FIG. 4, for example.

Referring to FIGS. 5, at step 502, the method 500 begins. At step 504, the method 500 receivers, at a receiver circuit (e.g., the inter-IC receiver 218), a plurality of samples of a radio frequency signal received from a tuner (e.g., inter-IC transmitter 216), a clock, and a target size value. At step 506, the method 500 outputs, from the receiver circuit, the samples at a first rate based on the target size value. At step 508, the method 500 receives, at a sample rate converter (e.g., the SRC 302), the samples from the receiver circuit and a rate offset value. At step 510, the method 500 outputs, from the sample rate converter, the samples at a second rate based on the rate offset value.

At step 512, the method 500 receives, at a buffer (e.g., FIFO buffer 404), the samples from the sample rate converter. At step 514, the method 500 outputs the samples from the buffer. At step 516, the method 500 demodulates, at an orthogonal frequency-division multiplexing demodulator (e.g., digital demodulator 304), the samples received from the buffer. At step 518, the method 500 generates, at a control loop (e.g., the control loop may include the first combiner 406, the loop filter 408, and the second combiner 410), the target size value to prevent the buffer from underflowing and from overflowing. The method 500 ends at step 520.

CONCLUSION

Any of the embodiments described above can be implemented in association with mobile devices such as cellular handsets. The principles and advantages of the embodiments can be used for any systems or apparatus, such as any uplink wireless communication device, that could benefit from any of the embodiments described herein. The teachings herein are applicable to a variety of systems. Although this disclosure includes example embodiments, the teachings described herein can be applied to a variety of structures. Any of the principles and advantages discussed herein can be implemented in association with RF circuits configured to process signals having a frequency in a range from about 30 kHz to 300 GHz, such as in a frequency range from about 400 MHz to 8.5 GHz or in a frequency range from about 400 MHz to 5 GHz.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an car piece, a telephone, a television, a computer monitor, a computer, a modem, a hand-held computer, a laptop computer, a tablet computer, a microwave, a refrigerator, a vehicular electronics system such as an automotive electronics system, a robot such as an industrial robot, an Internet of things device, a stereo system, a digital music player, a radio, a camera such as a digital camera, a portable memory chip, a home appliance such as a washer or a dryer, a peripheral device, a wrist watch, a clock, etc. Further, the electronic devices can include unfinished products.

Conditional language used herein, such as, among others, "can," "could," "might," "may," "e.g.," "for example", "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

The examples shown in the figures illustrate the filter components or filtering stages as discrete "blocks". Those skilled in the art will appreciate, given the benefit of this disclosure, that any or all of the filters shown in the various examples may be made up of many stages and/or combined or share components in different physical implementations. Accordingly, the examples shown in the figures are intended to be functional illustrations and not limiting in any aspect with respect to actual implementations of the radio frequency circuit assembly or front-end module. Aspects and embodiments provide a noise cancellation approach that can be designed into the overall front-end module configuration such that the overall filter out-of-band attenuations required can be relaxed, requirements on some or all the filter sections may be relaxed to provide more optimal and lower insertion losses, and the net insertion loss and out-of-band attenuation/isolation properties of the entire front-end module may exhibit less loss, more isolation, and more out-of-band attenuation where desired.

While certain embodiments have been described, these embodiments have been presented by way of example only, and are not intended to limit the scope of the disclosure. Indeed, the novel resonators, filters, modules, devices, wireless communication devices, apparatus, and systems described herein may be embodied in a variety of other forms. Furthermore, various omissions, substitutions and changes in the form of the resonators, filters, modules, devices, wireless communication devices, apparatus, and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and/or acts of the various embodiments described above can be combined to provide further embodiments. Accordingly, the foregoing description and drawings are by way of example only, and the scope of the disclosure should be determined from proper construction of the appended claims, and their equivalents.

What is claimed is:

1. A demodulator circuit comprising:
   a receiver circuit configured to receive a clock, a plurality of samples of a radio frequency signal received from a tuner, and a target size value, the receiver circuit further configured to output the samples at a first rate based on the target size value;
   a sample rate converter configured to receive the samples from the receiver circuit and a rate offset value, and to output the samples at a second rate based on the rate offset value;
   a buffer configured to receive the samples from the sample rate converter;
   a digital demodulator configured to receive the samples from the buffer and demodulate the samples; and
   a control loop configured to generate the target size value to prevent the buffer from underflowing and from overflowing.

2. The demodulator circuit of claim 1 wherein the digital demodulator is further configured to synchronize with the tuner and generate an ideal request size value based on the synchronizing with the tuner, the control loop further configured to generate the target size value based at least in part on the ideal request size value.

3. The demodulator circuit of claim 2 wherein the control loop includes:
   a first combiner configured to output a difference value between half of a size of the buffer and a current volume of samples in the buffer;
   a loop filter configured to receive the difference value from the first combiner and generate a delta value; and a second combiner configured to receive the delta value from the loop filter and the ideal request size value from the digital demodulator, the second combiner further configured to generate the target size value based on the delta value and the ideal request size value.

4. The demodulator circuit of claim 1 wherein the receiver circuit includes an inter integrated circuit sound receiver.

5. The demodulator circuit of claim 1 further comprising a clock generator configured to generate a demodulator clock, wherein the demodulator clock is asynchronous with a tuner clock of the tuner.

6. The demodulator circuit of claim 1 wherein the sample rate converter, the buffer, the digital demodulator, and the control loop are implemented by a software function.

7. The demodulator circuit of claim 6 wherein the receiver circuit includes an internal buffer and the receiver circuit is configured to execute the software function in response to a current volume of samples in the internal buffer being equal to the target size.

8. A digital radio system comprising:
a tuner circuit configured to receive a passband radio frequency signal and convert the passband radio frequency signal into a baseband signal; and
a demodulator circuit including: a receiver circuit configured to receive a clock, a plurality of samples of a radio frequency signal received from the tuner circuit, and a target size value, the receiver circuit further configured to output the samples at a first rate based on the target size value; a sample rate converter configured to receive the samples from the receiver circuit and a rate offset value, and to output the samples at a second rate based on the rate offset value; a buffer configured to receive the samples from the sample rate converter; a digital demodulator configured to receive the samples from the buffer and demodulate the samples; and a control loop configured to generate the target size value to prevent the buffer from underflowing and from overflowing.

9. The digital radio system of claim 8 wherein the digital demodulator is further configured to synchronize with the tuner circuit and generate an ideal request size value based on the synchronizing with the tuner circuit, the control loop further configured to generate the target size value based at least in part on the ideal request size value.

10. The digital radio system of claim 9 wherein the control loop includes:
a first combiner configured to output a difference value between half of a size of the buffer and a current volume of samples in the buffer;
a loop filter configured to receive the difference value from the first combiner and generate a delta value; and
a second combiner configured to receive the delta value from the loop filter and the ideal request size value from the digital demodulator, the second combiner further configured to generate the target size value based on the delta value and the ideal request size value.

11. The digital radio system of claim 8 wherein the receiver circuit includes an inter integrated circuit sound receiver.

12. The digital radio system of claim 8 wherein the demodulator further includes a clock generator configured to generate a demodulator clock, wherein the demodulator clock is asynchronous with a tuner clock of the tuner circuit.

13. The digital radio system of claim 8 wherein the sample rate converter, the buffer, the digital demodulator, and the control loop are implemented by a software function.

14. The digital radio system of claim 13 wherein the receiver circuit includes an internal buffer and the receiver circuit is configured to execute the software function in response to a current volume of samples in the internal buffer being equal to the target size.

15. A method of demodulating a radio frequency signal comprising:
receiving, at a receiver circuit, a plurality of samples of a radio frequency signal received from a tuner, a clock, and a target size value;
outputting, from the receiver circuit, the samples at a first rate based on the target size value;
receiving, at a sample rate converter, the samples from the receiver circuit and a rate offset value;
outputting, from the sample rate converter, the samples at a second rate based on the rate offset value;
receiving, at a buffer, the samples from the sample rate converter;
outputting the samples from the buffer;
demodulating, at a digital demodulator, the samples received from the buffer; and
generating, at a control loop, the target size value to prevent the buffer from underflowing and from overflowing.

16. The method of claim 15 further comprising:
synchronizing, at the digital demodulator, with the tuner;
generating, at the digital demodulator, an ideal request size value based on the synchronizing with the tuner; and
generating, at the control loop, the target size value based at least in part on the ideal request size value.

17. The method of claim 16 further comprising:
outputting, at a first combiner, a difference value between half of a size of the buffer and a current volume of samples in the buffer;
receiving, at a loop filter, the difference value from the first combiner and generate a delta value;
receiving, at a second combiner, the delta value from the loop filter and the ideal request size value from the digital demodulator; and
generating, at the second combiner, the target size value based on the delta value and the ideal request size value.

18. The method of claim 15 wherein the receiver circuit includes an inter integrated circuit sound receiver.

19. The method of claim 15 further comprising generating, at a clock generator, a demodulator clock, wherein the demodulator clock is asynchronous with a tuner clock of the tuner.

20. The method of claim 15 wherein the sample rate converter, the buffer, the digital demodulator, and the control loop are implemented by a software function.

* * * * *